July 14, 1953
G. W. BLACK
2,645,370
HAND TRUCK
Filed Nov. 23, 1951
2 Sheets—Sheet 1
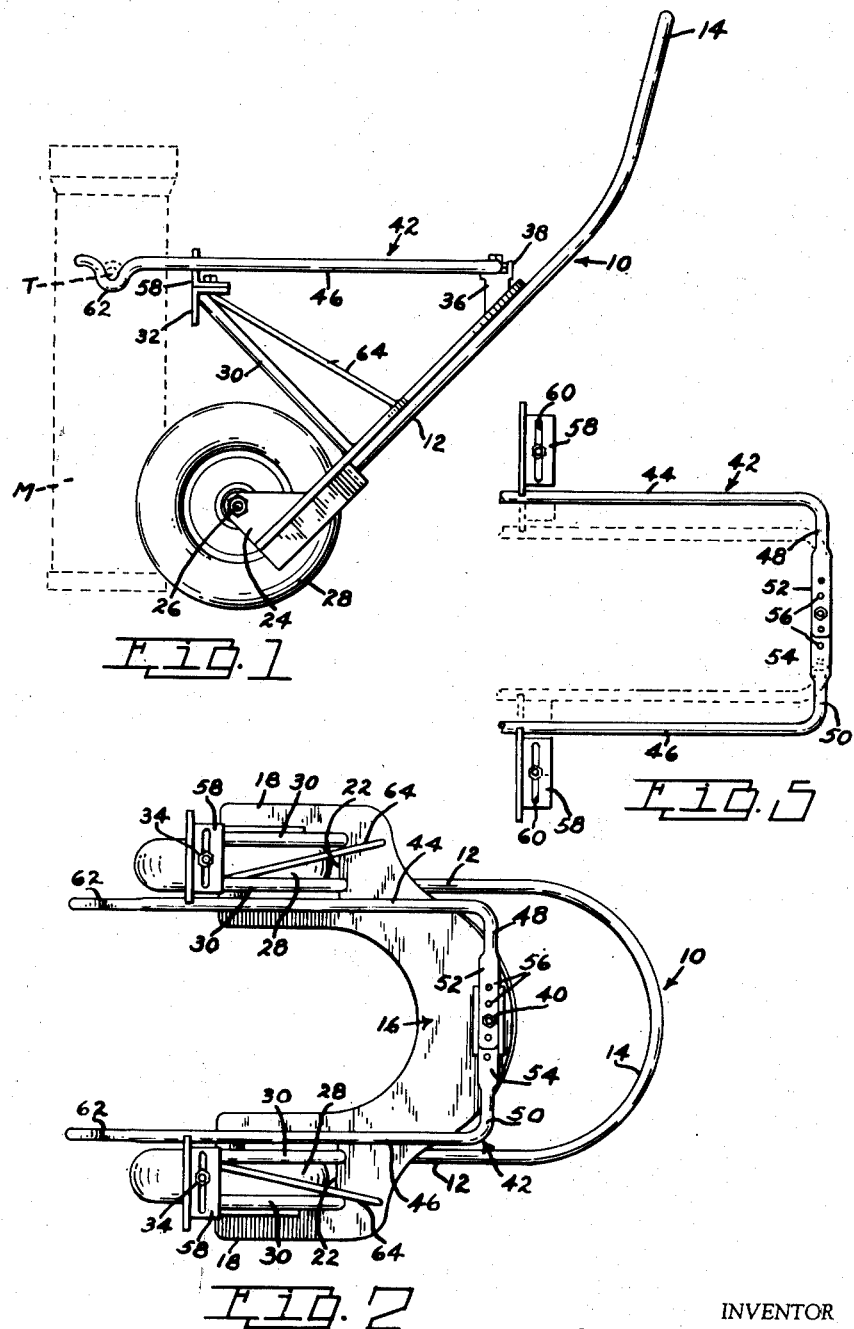
INVENTOR
GEORGE W. BLACK
BY
J.B.Dickman, Jr.
ATTORNEY July 14, 1953　　　G. W. BLACK　　　2,645,370
HAND TRUCK Filed Nov. 23, 1951　　　　　　　2 Sheets-Sheet 2

INVENTOR
GEORGE W. BLACK

BY

J. B. Dickman, Jr.
ATTORNEY

Patented July 14, 1953

2,645,370

UNITED STATES PATENT OFFICE 2,645,370

HAND TRUCK

George W. Black, Houston, Tex.

Application November 23, 1951, Serial No. 257,894

3 Claims. (Cl. 214—384)

The present invention relates to a hand truck and more particularly to a hand truck of the type employed for transporting elongated objects such as sewer pipe or the like.

The primary object of the invention is to facilitate the loading, transportation and unloading of a mold containing a freshly cast pipe length from a source of production to a curing station.

Another object is to relieve the user of strain during the loading, transportation and unloading of the truck and to enable molds of differing widths to be handled.

The above and other objects may be attained by employing this invention which embodies among its features a pair of upwardly inclined spaced substantially parallel legs carrying at their upper ends a transversely extending grip, a substantially inverted U-shaped plate carried by the legs adjacent the lower ends thereof, wheels carried by the plate adjacent the lower edge thereof for rotation about a common horizontal axis, upwardly inclined struts carried by the plate intermediately the ends thereof, an elongated substantially U-shaped load support mounted intermediate its ends on the struts substantially directly above the horizontal axis, means connecting one end of the load support to the plate adjacent the upper end thereof, and load sustaining hooks carried by the load support adjacent the end thereof remote from the plate.

Other features include means carried by the struts for connecting the load support thereto for adjustment laterally of the truck, and means carried by the plate to permit lateral adjustment of the load support relative thereto.

In the drawings:

Figure 1 is a side view of a hand truck embodying the features of this invention.

Figure 2 is a top plan view of the truck illustrated in Figure 1.

Figure 5 is a plan view of the load support.

Figure 3:
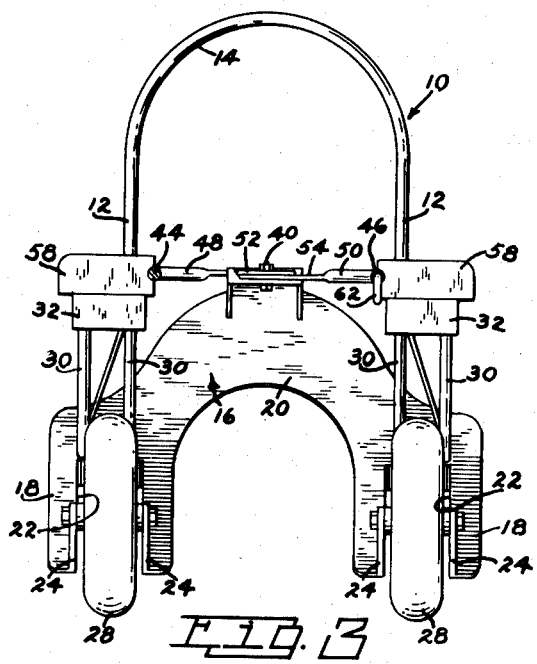
Figure 3 is a front view of the truck illustrated in Figure 1, certain portions being broken away to more clearly illustrate certain details of construction.
Figure 4:
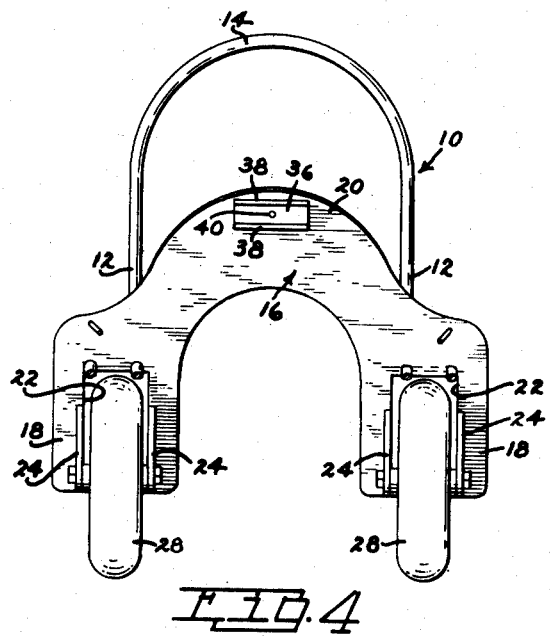
Figure 4 is a plan view of the truck showing the load support removed and portions of the truck broken away.

Referring to the drawings in detail an upwardly inclined substantially inverted U-shaped handle designated generally 10 comprises a pair of spaced substantially parallel legs 12 which incline upwardly and are connected at their upper ends by an arched grip 14. Carried by the legs 12 adjacent the lower ends thereof is a substantially inverted U-shaped plate designated generally 16 and comprising spaced parallel relatively wide legs 18 which are connected at their upper ends by an arched bight portion 20 which serves as a counterweight when a load is being carried by the truck. The plate 16 lies against the legs 12 and inclines upwardly adjacent said legs 12 and opening through the lower ends of the legs 18 are elongated recesses 22 which terminate intermediate the ends of the plate 16. Carried by the legs 18 adjacent opposite sides of the recesses 22 are upwardly extending brackets 24 in which are mounted adjacent their upper ends axle shafts 26 which lie along a common horizontal axis. A wheel 28 is mounted on each axle shaft 26 to rotate about the common axis in a closed path which lies within a recess 22.

Carried by each leg 18 of the plate 16 and extending upwardly therefrom in perpendicular relation to the upper surface thereof is a pair of spaced parallel struts 30 which terminate at their upper ends substantially directly above the horizontal axis about which rotate the wheels 28. Transversely extending bearing brackets 32 are carried by the upper ends of the struts 30 and bridge the recesses 22 above the wheels 28. Each bearing bracket carries intermediate its ends an upwardly extending threaded stud 34 the purpose of which will hereinafter appear. Carried by the plate 16 adjacent the upper end thereof is an elongated guide bracket 36 which extends transversely of the truck and is provided adjacent opposite longitudinal edges with upwardly extending guide flanges 38. A threaded upwardly extending stud 40 is carried by the bracket 36 intermediate the ends thereof and substantially midway between the flanges 38, the purpose of which will presently appear.

A load support designated generally 42 comprises a pair of spaced substantially parallel arms 44 and 46 having respectively at one end of the load support perpendicular extensions 48 and 50. The extensions are flattened as at 52 and 54 respectively and each extension is provided with a longitudinal row of longitudinally spaced openings 56. As illustrated in the drawings the flattened portions 52 and 54 overlap one another so that selected openings 56 may be brought into register to receive the strut 40 carried by the bracket 36 to hold the ends of the arms 44 and 46 adjacent the plate 16 a selected distance apart. Carried by the arms 44 and 46 intermediate their ends are outwardly extending angle brackets 58 which extend perpendicularly with relation to their respective arms in a direction opposite the perpendicular extension on the respective arms. The angle brackets 58 are provided with elongated longitudinal slots 60 for the reception of the studs 34 of the bearing brackets 32. Carried by the arms 44 and 46 adjacent the ends thereof remote from the extensions 48 and 50 are load sustaining hooks 62 which extend forwardly from the truck for a short distance beyond the wheels 28 so that the center of gravity of a load supported by the hooks will be such that the weight of the load will be substantially counterbalanced by the weight of the plate 16 and handle member 10. Suitable braces 64 are connected to the plate 16 adjacent the junction of the legs 18 with the arched bight portion 20 thereof and extend upwardly and inwardly and are connected to the bearing brackets 32 adjacent the innermost struts 30.

In use the grip 14 is grasped by the user and the truck is wheeled to a loading station where the truck is tilted forwardly about the horizontal axis to cause the hooks to be lowered so as to pass beneath the trunnions T carried by the mold M of the pipe to be transported. Upon tilting the truck so that the load support 42 extends substantially horizontally as shown in Figure 1, the mold contents thereof will be elevated so that the truck and its load can be wheeled to an unloading station where the load can be deposited simply by again tilting the truck forwardly to a position at which the hooks 62 will pass beneath the trunnions T so that the truck may be withdrawn.

From the foregoing description, when taken in connection with the accompanying drawings, the advantages of the construction and operation will be apparent to those skilled in the art to which the invention appertains, and I desire to have it understood that the device shown is merely illustrative and that such changes may be made within the scope of the claims hereto appended.

What is claimed is:

1. A hand truck comprising a handle member having upwardly inclined spaced substantially parallel legs and a grip carried by and extending between the legs adjacent the upper ends thereof, a substantially inverted U-shaped plate carried by and extending between the legs adjacent the lower end thereof, said plate having spaced parallel elongated recesses opening through the lower end thereof, wheels carried by the plate adjacent the lower end thereof for rotation about a common axis in vertical arcuate paths which extend into the recesses, the axles of said wheels being in a plane above the plate, upwardly inclined struts carried by the plate adjacent the upper ends of the recesses and terminating above the wheels, and an elongated load support connected adjacent one end to the plate adjacent its upper end and intermediate its ends to the struts adjacent the upper ends thereof.

2. The structure defined in claim 1 in which the load support comprises substantially L-shaped members having elongated arms mounted intermediate their ends on the struts for adjustment laterally of the truck, overlapping extensions carried by the arms and connected to the plate for adjustment laterally of the truck, and load supporting hooks adjacent the ends of the arms remote from the plate.

3. The structure defined in claim 1 in which the ends of the struts remote from the plate carry transversely extending bearing brackets each having an upwardly extending threaded stud intermediate its ends and the load support carries intermediate its ends laterally extending longitudinally slotted angle brackets which rest on the bearing brackets with the studs projecting through the slots, and nuts threaded on the studs for holding the angle brackets in selected position on the bearing brackets.

GEORGE W. BLACK.

References Cited in the file of this patent

UNITED STATES PATENTS

| Number | Name | Date |
|---|---|---|
| 759,459 | Minter | May 10, 1904 |
| 1,717,377 | Forry | June 18, 1929 |

FOREIGN PATENTS

| Number | Country | Date |
|---|---|---|
| 314,286 | Italy | Jan. 22, 1934 |
| 118,261 | Sweden | Feb. 25, 1947 |
| 538,165 | Great Britain | July 23, 1941 |
| 617,051 | Great Britain | Jan. 31, 1949 |